US008396949B2

(12) United States Patent
Bubolz et al.

(10) Patent No.: US 8,396,949 B2
(45) Date of Patent: Mar. 12, 2013

(54) METADATA DRIVEN AUTOMATIC DEPLOYMENT OF DISTRIBUTED SERVER SYSTEMS

(75) Inventors: Jason H. Bubolz, Seattle, WA (US); Kenneth L. Alverson, Redmond, WA (US); Nirav A. Kamdar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 12/792,888

(22) Filed: Jun. 3, 2010

(65) Prior Publication Data

US 2011/0302573 A1 Dec. 8, 2011

(51) Int. Cl.
G06F 15/177 (2006.01)
G06F 9/445 (2006.01)
(52) U.S. Cl. ........ 709/221; 709/227; 709/229; 709/225; 709/223; 709/228; 726/12; 726/21
(58) Field of Classification Search ................. 709/221, 709/220, 227, 229, 223, 225, 228, 222, 202
See application file for complete search history.

(56) References Cited

U.S. PATENT DOCUMENTS

| | | | |
|---|---|---|---|
| 7,155,380 B2 | 12/2006 | Hunt et al. | |
| 7,210,143 B2 | 4/2007 | Or et al. | |
| 7,451,149 B2 * | 11/2008 | Lee et al. | 1/1 |
| 7,630,877 B2 | 12/2009 | Brown et al. | |
| 2007/0124482 A1* | 5/2007 | Lee et al. | 709/228 |
| 2008/0134320 A1* | 6/2008 | Desai et al. | 726/21 |
| 2008/0228902 A1 | 9/2008 | Pichetti et al. | |
| 2008/0289019 A1 | 11/2008 | Lam | |
| 2009/0007095 A1 | 1/2009 | Alverson et al. | |
| 2010/0030893 A1 | 2/2010 | Berg et al. | |
| 2010/0058331 A1 | 3/2010 | Berg et al. | |
| 2010/0306268 A1* | 12/2010 | Bhatti et al. | 707/783 |
| 2011/0083037 A1* | 4/2011 | Bocharov et al. | 714/4.11 |

OTHER PUBLICATIONS

Lehman, et al., "OptimalGrid: Middleware for Automatic Deployment of Distributed FEM problems on an Internet-based computing grid", Retrieved at <<http://ieeexplore.ieee.org/stamp/stamp.jsp?tp=&arnumber=1253312 >>, Fifth IEEE International Conference on Cluster Computing (CLUSTER'03), Dec. 1-4, 2003, pp. 9.
"How Role-Based Deployment Works", Retrieved at <<http://support.gfi.com/manuals/en/mar6gsg/mar6gsgmanual.1.22.html >>, Retrieved Date: Apr. 12, 2010, pp. 4.
Hanselman, Scott., "Managing Large-scale System Deployment and Configuration with Windows PowerShell", Retrieved at <<http://www.hanselman.com/blog/content/binary/Hanselman%20-%20Managing%20System%20Deployment%20with%20PowerShell.pdf >>, Retrieved Date: Apr. 12, 2010, pp. 28.

* cited by examiner

Primary Examiner — Jude Jean Gilles
(74) Attorney, Agent, or Firm — Turk IP Law, LLC

(57) ABSTRACT

Automatic and reliable deployment of system topology to computing devices within an enhanced communication system is provided. Specific roles and features associated with individual devices such as servers are defined in a centrally managed topology document, which is replicated to devices to be configured along with one or more modules for performing local configuration. Upon deployment, the module(s) determine a local device configuration, a desired configuration for the device, and update the device's configuration installing and activating roles and features assigned to the device by the topology document. Feedback regarding the results of the configuration is provided to a central management store such that administration can monitor status of devices within the system. Modifications to the assigned roles and prerequisites for supporting those roles are made dynamically through the same mechanism as system topology changes.

20 Claims, 6 Drawing Sheets

METADATA DRIVEN AUTOMATIC DEPLOYMENT OF DISTRIBUTED SERVER SYSTEMS

BACKGROUND

As an alternative to Public Switched Telephone Network (PSTN) systems, cellular phone networks have proliferated over the last decades, where users with cellular phones have access to one or more networks at almost any location. Also a recent development is the wide spread use of Voice over IP (VOIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice calls, video communications, etc.). This technology is also referred to as unified communications (UC). A network of servers manages end devices capable of handling a wide range of functionality and communication while facilitating communications between the more modern unified communication network devices and other networks (e.g. PSTN, cellular, etc.).

Enhanced communication systems provide multi-modal communications and other services employing a number of physical and virtual servers and specialized devices. In some cases, generic local machines (servers) may be configured with special roles within the topology of the system and become specialized servers providing distinct functionality. Deployment of such a system and its topology can be relatively complex as more features and roles are added. Administration not only needs to be able to install particular roles, but also to ensure that correct roles are installed and necessary to provide the required functionality. In a large system environment (e.g. thousands of users), dozens of machines may need to be installed with an error proof and efficient process.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatic and reliable deployment of system topology to computing devices within an distributed server system. Specific roles and features associated with individual devices such as servers may be defined in a centrally managed topology document, which is replicated to devices to be configured along with one or more modules for performing local configuration. Upon deployment, the module(s) may determine a local device configuration, a desired configuration for the device, and update the device's configuration installing and activating roles and features assigned to the device by the topology document. Feedback regarding the results of the configuration may be provided to a central management store such that administration can monitor status of devices within the system. Modifications to the assigned roles and prerequisites for supporting those roles may be made dynamically through the same mechanism as system topology changes.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
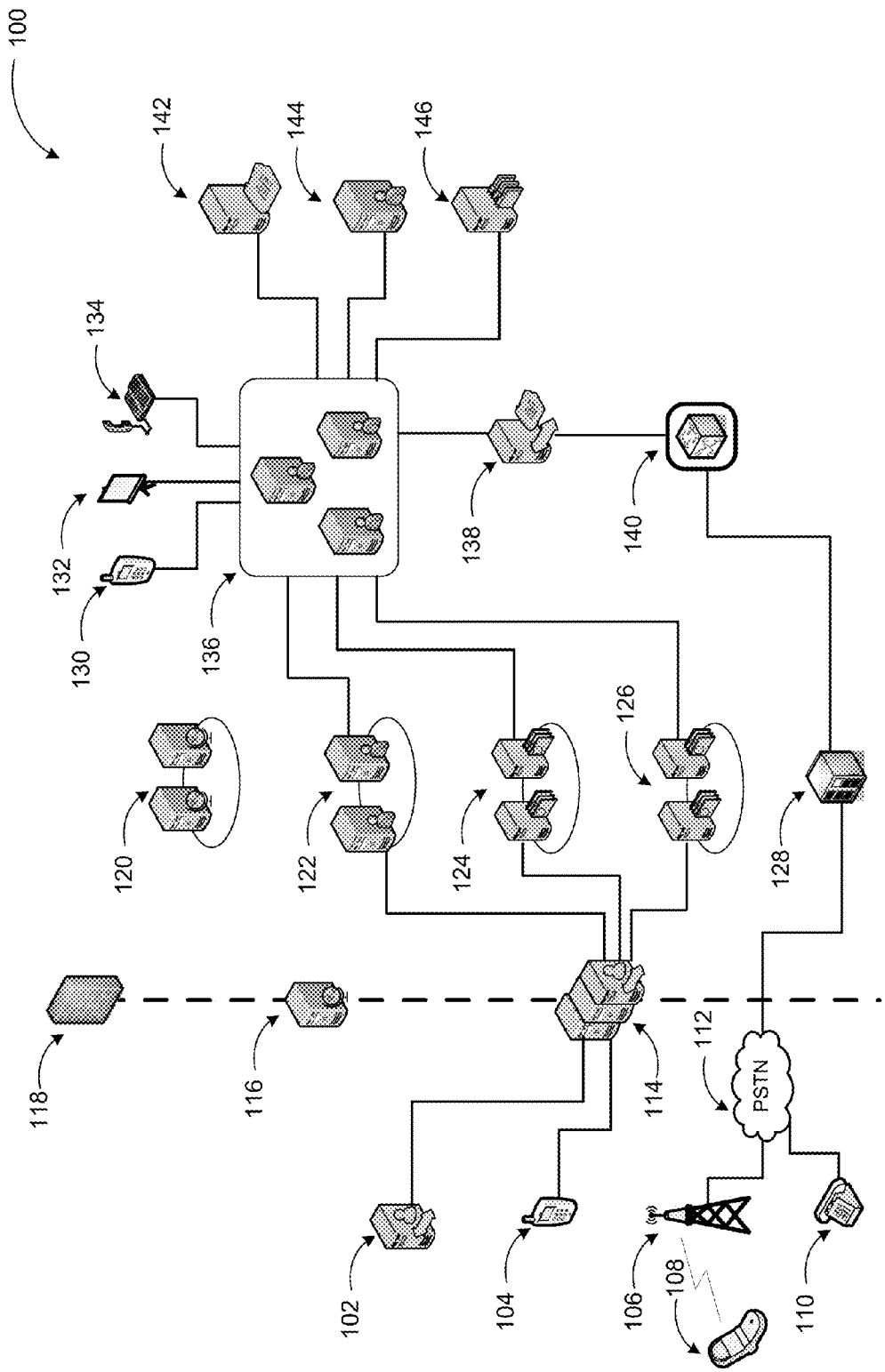
FIG. 1 is a diagram illustrating an example enhanced communications system such as a UC system, where embodiments may be implemented for providing metadata driven automatic deployment of system topology.

As briefly described above, specific roles and features assigned to individual devices such as servers may be defined in a centrally managed topology document, which may be replicated to the devices to be configured along with one or more modules for performing local deployment. The module(s) may determine a local device configuration, a desired configuration for the device, and update the device's configuration installing and activating roles and features assigned to the device by the topology document. Results of the deployment may be sent back to a central management store such that administration can monitor status of devices within the system. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing multimodal communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "site" as used herein refers to a geographical location and may include data centers, branch offices, and similar communication sub-systems. The term "device" or "computing device" refers to any computing machine such as servers, desktop computers, special purpose machines, and similar ones. Further examples of computing devices are discussed below. Furthermore, the term cluster refers to a group of physical and/or virtual servers, which may provide the same service to a client in a transparent manner (i.e., the client sees a single server, while the cluster may have a plurality of servers).

FIG. 1 includes diagram 100 illustrating an example enhanced communications system such as a UC system, where embodiments may be implemented for providing metadata driven automatic deployment of system topology. Embodiments are directed to distributed server systems, of which enhanced communications systems (e.g. UC systems) are just one example. Thus, embodiments are not limited to communication systems, and may be implemented in any distributed server system. A unified communication (UC) system is an example of modern communication systems with a wide range of capabilities and services that can be provided to subscribers. A unified communication system is a real-time communications system facilitating email exchange, instant messaging, presence, audio-video conferencing, web conferencing, and similar functionalities.

In a unified communication (UC) system such as the one shown in diagram 100, users may communicate via a variety of end devices 130, 132, 134, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through Private Branch Exchange (PBX) 128 to a Public Switched Telephone Network (PSTN) 112. Further communications through PSTN 112 may be established with a telephone 110 or cellular phone 108 via cellular network tower 106. End devices 130, 132, 134 may include any type of smart phone, cellular phone, any computing device executing a communication application, a smart automobile console, and advanced phone devices with additional functionality.

The UC system shown in diagram 100 may include a number of servers performing different tasks. For example, edge servers 114 may reside in a perimeter network and enables connectivity through UC network(s) with other users such as remote user 104 or federated server 102 (for providing connection to remote sites). A Hypertext Transfer Protocol (HTTP) reverse protocol proxy server 116 may also reside along the firewall 118 of the system. Edge servers 114 may be specialized for functionalities such as access, web conferencing, audio/video communications, and so on. Inside the firewall 118, a number of clusters for distinct functionalities may reside. The clusters may include web servers for communication services 120, directory servers 122, web conferencing servers 124, and audio/video conferencing and/or application sharing servers 126. Depending on provided communication modalities and functionalities, fewer or additional clusters may also be included in the system.

The clusters of specialized servers may communicate with a pool of registrar and user services servers 136. The pool of registrar and user services servers 136 is also referred to as a data center. A UC system may have one or more data centers, each of which may be at a different site. Registrar servers in the pool register end points 130, 132, and 134, and facilitate their communications through the system acting as home servers of the end points. User services server(s) may provide presence, backup monitoring, and comparable management functionalities. Pool 136 may include a cluster of registrar servers. The registrar servers may act as backups to each other. The cluster of registrar servers may also have backup clusters in other data servers as described later.

Mediation server 138 mediates signaling and media to and from other types of networks such as a PSTN or a cellular network (e.g. calls through PBX 128) together with IP-PSTN gateway 140. Mediation server 138 may also act as a Session Initiation Protocol (SIP) user agent. In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

Additional components of the UC system may include messaging server 142 for processing voicemails and similar messages, application server 144 for specific applications, and archiving server 146. Each of these may communicate with the data center pool of registrar and user services servers 136. Various components of the system may communicate using protocols like SIP, HTTP, and comparable ones.

As discussed previously, deployment of large enhanced communication systems with a complex topology and a high number of servers, features, and roles can be a challenging and resource intensive task. Typical installation processes may include smart user interfaces that may handle automatic installation of prerequisites, intelligent blocking of unavailable tasks, and a series of wizards to walk the administrator through the creation of common roles and combinations of roles. However, the administrator is still responsible, in conventional approaches, for making sure that the set-up roles are the roles that needed to be set up, and that inter-computer dependencies are met. A deployment system according to embodiments, may employ a central topology document defining assigned roles and features for individual devices. At deployment time (or following changes to the topology), the topology document may be replicated to all devices along with one or more modules responsible for local configuration. These modules may determine local machine configuration, retrieve desired configuration from the topology document, install and activate assigned roles and features (remove unnecessary ones), and report back to a central store such that device status can be monitored centrally and dynamically.

While the example system in FIG. 1 has been described with specific components such as registrar servers, mediation servers, A/V servers, and similar devices, embodiments are not limited to these components or system configurations and can be implemented with other system configuration employing fewer or additional components and other distributed server systems. Functionality of enhanced communication systems with automatic topology deployment may also be distributed among the components of the systems differently depending on component capabilities and system configurations. Furthermore, embodiments are not limited to unified communication systems. The approaches discussed here may be applied to any distributed server system such as email servers, business intelligence servers, file servers, other database applications, and comparable systems in a networked communication environment using the principles described herein.

Figure 2:
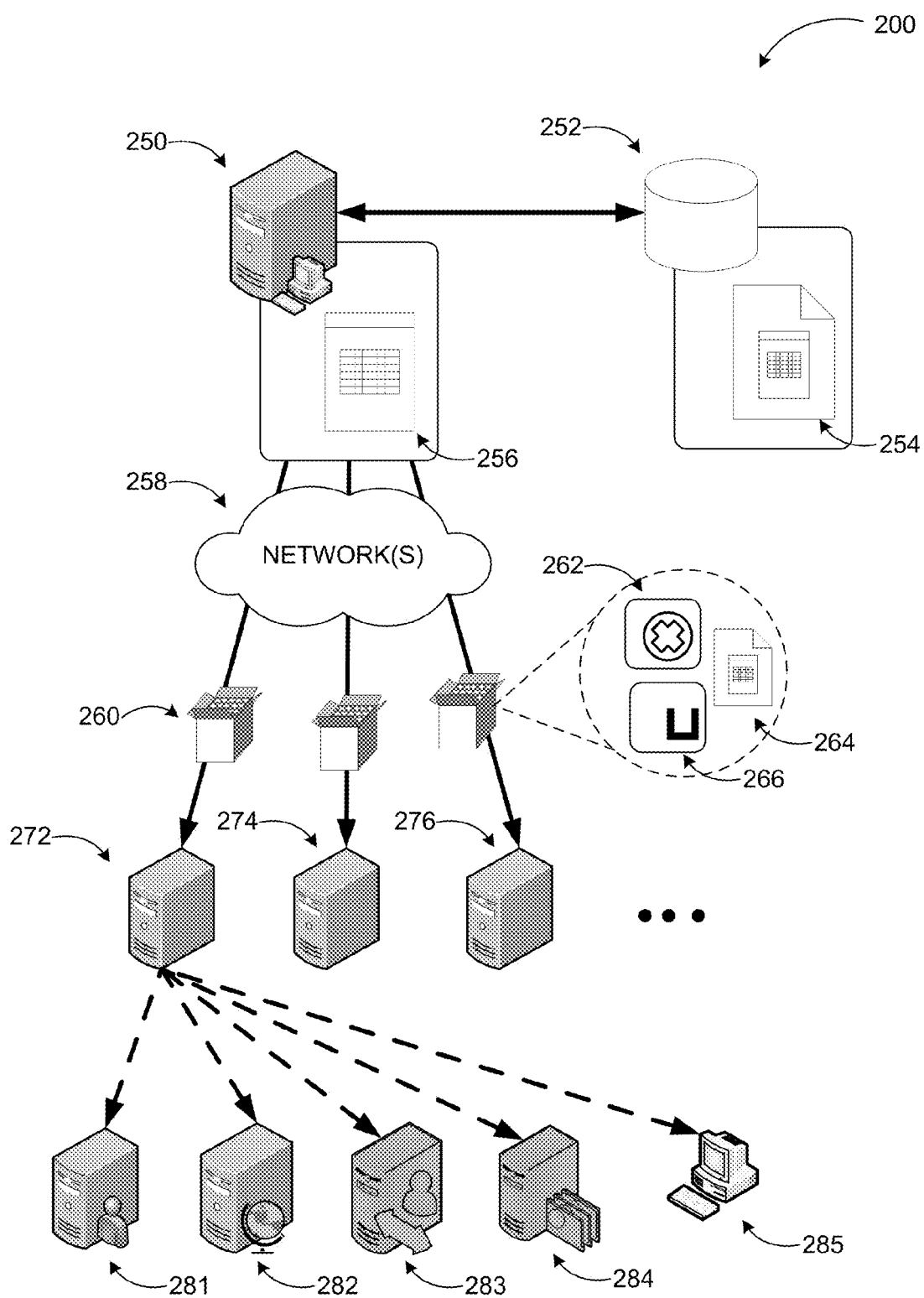
FIG. 2 is a conceptual diagram illustrating replication of system topology to individual devices and configuration of the individual devices in a system according to embodiments.

FIG. 2 is a conceptual diagram illustrating replication of system topology to individual devices and configuration of the individual devices in a system according to embodiments. As discussed above, enhanced communication systems such as UC systems provide the infrastructure for enterprise or cloud based instant messaging, presence, file transfer, peer-to-peer and multiparty voice and video calling, ad hoc and structured conferences (audio, video and web) and PSTN connectivity. These communication modes and additional features such as voicemail processing, conversation recording, interactions with other applications, may be made available within an organization, between organizations, and with external users on the public internet, or standard phones on the PSTN as well as SIP trunking.

Remote users, both corporate users on the internet (e.g. mobile or home workers), users in partner companies, and federated users through interoperability with other instant messaging networks may also be served through such systems. The system may include a number of specialized clusters and individual servers communicating with each other using SIP, Real time Transfer Protocol (RTP) for media transfer, Hypertext Transfer Protocol (HTTP) for web servers, and similar protocols as well as their extensions. Furthermore, server caching such as caching of repeated requests and/or caching web/DNS/other computer network lookups for a group of clients sharing network resources may be employed to optimize resource usage and efficiency.

In a multi-faceted system such as an enhanced communication system, a number of specialized servers may provide distinct functionalities such as web access servers, edge servers, registrar servers, and comparable ones. Furthermore, computing devices within the network may also be configured as end points. Thus, deployment of the system initially, and any changes to its topology may require configuration and reconfiguration of its components with their assigned roles and features. While some devices may be specialized hardware (e.g. hardware load balancers "HLBs"), others may be generic computing devices like servers that are simply configured to perform the assigned tasks. Individually configuring all devices and maintaining their status as the topology changes can be daunting task, especially in larger networks.

As shown in diagram 200, a topology document 254 defining roles and features for each device in the system may be created by the administrators and stored at a central management store 252. An administration server 250 may execute central deployment components 256 for managing the topology document (e.g. managing a user interface for modifying the document, maintaining versions of the document, creating replicas to be distributed, etc.). Administration server 250 may distribute replicas of the topology document automatically to machines that can be automatically configured via network(s) 258. When the topology document 254 is published into the system, the central deployment components 256 may activate the environment, creating necessary entries in directory servers, configuring permissions, and performing similar tasks. These actions may be performed with an administrative permission on the domain itself.

In distributing the replica of the topology document 254 to the system, administrative server 250 may send the topology document 254 by replication, file copy, or a similar controlled means. The agent 262, and bootstrapper module 266 may be transported and installed through disk replication via sysprep and ghosting, SMS, or similar administrative techniques for installing software remotely. The agent 262, and bootstrapper module 266 may be installed once and then run locally as processes. They are not invoked remotely. The document may be transported on an on-going basis through replication as changes are made. In an initial installation, a package 260 that includes the document itself (264), agent 262, and bootstrapper module 266 may be sent by administrative server 250. Package 260 may be sent to individual computing devices (e.g. servers 272, 274, and 276) in a variety of ways. The packages may be sent by a software management tool like MICROSOFT SYSTEM CENTER® from Microsoft Corp. of Redmond, Wash., a remotely triggered installation via remote management APIs, file transfer protocol (FTP) download, or distribution by removable storage media (e.g. CDs, DVDs, etc.).

Once the topology package arrives on a local computing device, the agent 262 may cause the bootstrapper module 266 to be executed on the computing device and configure or reconfigure the machine (or they may be already installed and executed upon detection of a new topology document). Upon configuration with assigned roles and features, the computing device (e.g. server 272) may take the role of one or more of a registrar server 281, web server 282, edge server 283, web conferencing server 284, or even client 285.

Network(s) 258 and the networks employed by the example enhanced communication system of FIG. 1 may comprise any topology of servers, clients, Internet service providers, and communication media. A system according to embodiments may have a static or dynamic topology. Network(s) 258 may include a secure network such as an enterprise network, an unsecure network such as a wireless open network, or the Internet. Network(s) 258 may also coordinate communication over other networks such as PSTN or cellular networks. Network(s) 258 provides communication between the nodes described herein. By way of example, and not limitation, network(s) 258 may include wireless media such as acoustic, RF, infrared and other wireless media. Many other configurations of computing devices, applications, data sources, and data distribution systems may be employed to implement a communication system with automatic deployment of distributed server systems. Furthermore, the networked environments discussed in FIGS. 1 and 2 are for illustration purposes only. Embodiments are not limited to the example applications, modules, or processes.

Figure 3:
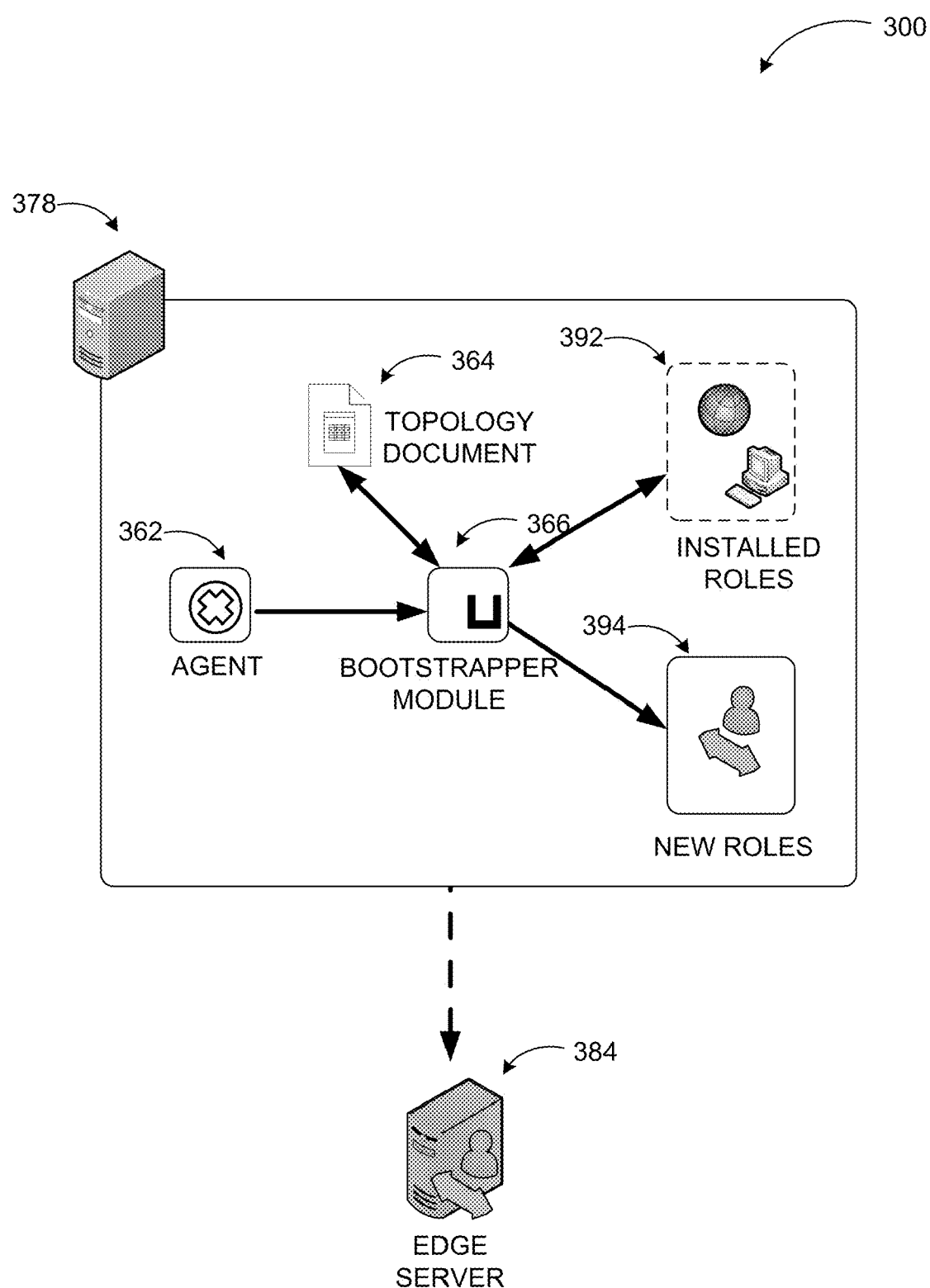
FIG. 3 is another conceptual diagram illustrating the configuration process in an example server of an enhanced communication system according to embodiments.

FIG. 3 is another conceptual diagram illustrating the configuration process in an example server of an enhanced communication system according to embodiments. Server 378 may be a generic server being added to the enhanced communication system or an existing server with assigned role(s) within the system that is receiving a topology update with new role(s) and/or features.

As shown in diagram 300, server 378 may receive a topology document 364 from an administrative server and already have agent 362, and bootstrapper module 366 installed. As mentioned previously, the agent and the bootstrapper components may be non-specific to any particular role. Thus, they may be installed separately from the topology document and lie dormant until they receive a topology document that includes the current device. It should be noted that because domain related actions are performed during publishing of the topology, the bootstrapper (as well as the agent and replica) may need only local device privileges to do their jobs.

Agent 362 may detect any changes (arrival of a new topology document) and activate bootstrapper module 366, which first discovers installed and configured roles 392 on the server 378 (e.g. web services, device management, etc.). If server 378 is being newly added, there may not be any existing roles. Bootstrapper module 366 may compare that list to the roles specified in the topology document 364 and perform a set difference, resulting in a list of roles no longer assigned to the server 378. Bootstrapper module 366 may deactivate and removes those roles, and determine roles that should be on the server 378. The module may then generate another list of prerequisites for those roles. The prerequisites may be checked, and if necessary installed. Next the bootstrapper module 366 may perform a set difference on the topology and the discovered roles, this time resulting in the list of roles 394 that should be on the server 378 but are not. Roles 394 (e.g. edge server) may be installed and configured using the configuration data in the topology. The installed roles may then be activated redefining a function of server 378 within the system (e.g. edge server 384).

Figure 4:
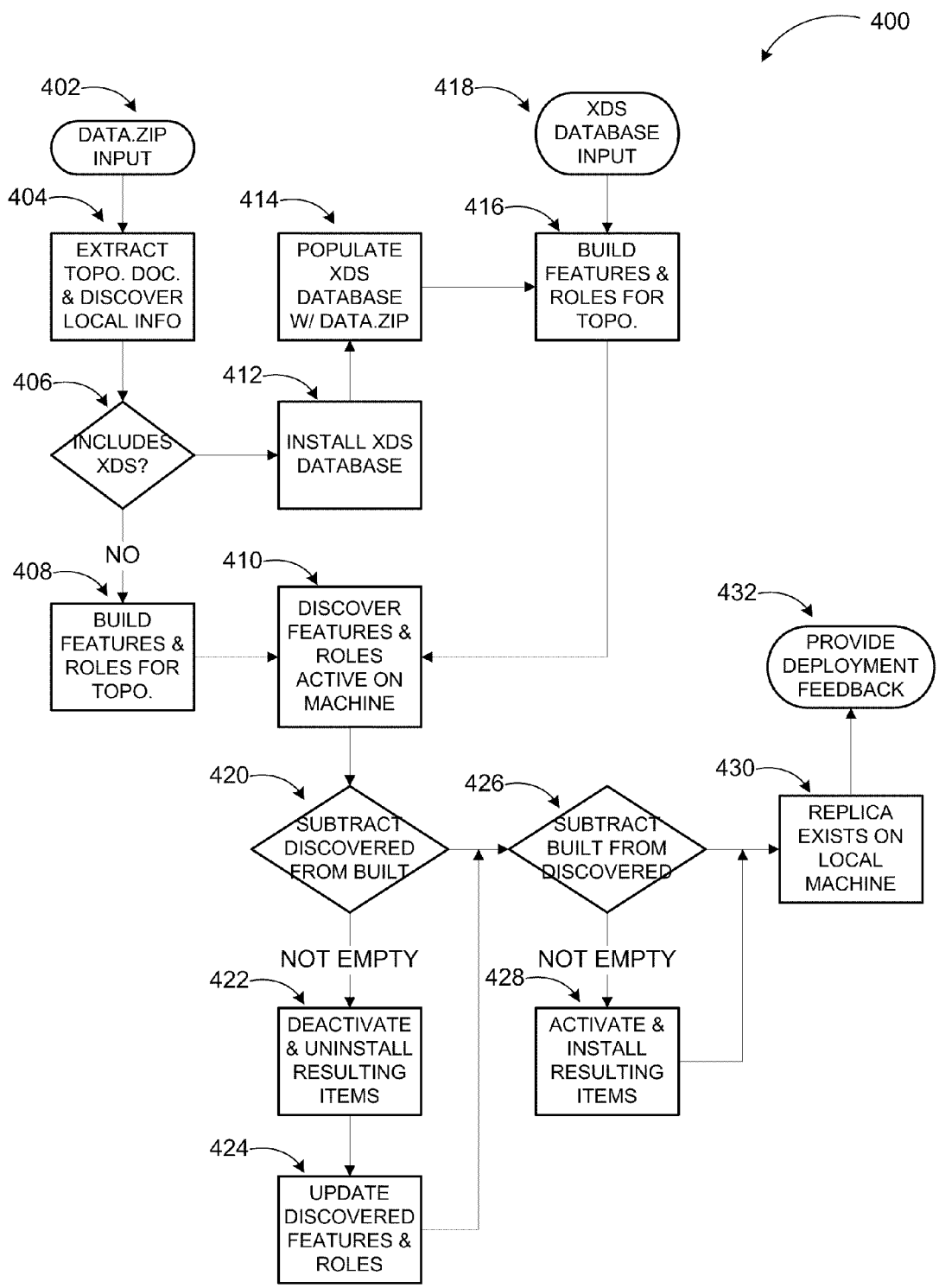
FIG. 4 is a block diagram illustrating example implementations of automatic deployment of distributed server systems.

FIG. 4 is a block diagram illustrating example implementations of automatic deployment of distributed server systems. A topology document according to embodiments may be created and distributed in a number of ways. According to some embodiments, a structured document schema such as cross-enterprise document sharing (XDS) may be used to share the document with computing devices within the system. Furthermore, such documents may tend to be relatively large. Thus, a compression algorithm such as zip may be used to transport the topology packages throughout the enhanced communication system. Embodiments are not limited to those structure schemas or compression techniques, however.

As shown in diagram 400, topology deployment may begin with receipt of the topology package (e.g. data.zip file) at a server to be configured (402). Next, the topology document may be extracted and the local configuration discovered by a bootstrapper (404). The bootstrapper may be included in the topology package along with the topology document or already installed at the server. The local configuration discovery may include a determination of whether the roles specified in the topology imply (or explicitly state) that a local copy of the configuration should be stored on this machine (e.g. in an Xds database) (406). On the other hand, a file server or a back-end database server may not have a local management store (e.g. Xds database/replica) and receive their topology from a file instead of storing at a local copy. These types of servers are not actively managed by the system, but still need to be set up in a semi-automatic manner. Normal roles (e.g. audio/video conferencing, web services, etc) may include a local copy of the configuration, and setup may be performed using the contents of the local copy, which may be updated through replication. If the server does not have existing roles, a set of features and roles may be built that satisfy the input topology (408).

If an existing configuration is discovered, the bootstrapper may ensure that a related database (the Xds/local management store database) is installed (412) and populate the database with data from the topology document (414) through replication (which happens prior to 418) or by the admin providing the configuration (402), which is stored as the local configuration. Bootstrapper may install other databases (like the back-end database, or the archiving database) as described in the topology, but the Xds/local management database can be considered part of the bootstrapper/agent. Every machine with the agent on it may have an Xds database. Certain machines may have a backend database, and it may be possible that a dedicated backend does not have an agent (and thus not get automatic bootstrapping). If no existing configuration is discovered, bootstrapper may install the Xds database and populate that database with data from the topology document. This completes the replication store, on which the deployment system is built.

If the existing configuration data (either updated from an existing configuration or new for a first time installation) calls for another database such as a user database, that database may also be installed. Thus, the database that gets populated with data from the topology document is always installed, and the databases which are conditional on the configuration do not receive data from the topology document. With information from existing configuration database and/or newly configured data from the topology document, a set of features and roles may be built that satisfy the input topology (416).

Next, the set of installed features and activated roles on the server may be discovered by the bootstrapper (410). The discovered features and roles may be compared to those built (420). If the comparison yields a non-empty set, resulting items may be deactivated and uninstalled along with any items that may depend on those in a reverse dependency order (422). Then, the set of discovered features and roles may be updated (424). Another comparison may be performed between built items and discovered items (426). If that operation results in a non-empty set, resulting roles and features may be installed and activated in a dependency order (428) after any necessary non-product pre-requisites are installed. The process may verify operating system configuration and features, install pieces that can be installed (e.g. SQL, .NET, PowerShell, modules, runtimes, etc) before installing roles and product features. Functions may be performed regardless of whether there is a replica on the machine. If the process arrives via (408), there is no replica on the machine. If the process arrives via (416), there is a replica on the machine (430). If there is a replica, the replica may be used to send feedback to the central management store. If there is no replica, the feedback may be given locally.

A deployment feedback (432) may also be provided to a central management store such that administrators can monitor which machines have been configured, which machines still need to be configured (possibly offline), which machines encountered errors and need attention, and the like. The feedback may include an identification of the server, a version identification of the processed topology, a result code, and any records of the installation and activation process. Since the system ensures that the topology is internally consistent, the administrators may just need to make sure that the devices have successfully configured themselves to match the topology to be confident that their environment is properly deployed. In situations where the deployment agent cannot be used or is not used by choice, the bootstrapper may be executed interactively, and the results delivered to a local console.

The example systems in FIG. 1 through 4 have been described with specific components such as registrar servers, communication servers, directory servers, presence servers, and the like. Embodiments are not limited to communication systems according to these example configurations. Furthermore, specific protocols and deployment components are described for communication between different devices. Embodiments are also not limited to the example protocols or components discussed above. Metadata driven automatic deployment of distributed server systems according to embodiments may be implemented using protocols, components, and configurations other than those illustrated herein employing fewer or additional components and performing other tasks. Moreover, embodiments may also be implemented in distributed server systems other than enhanced communication systems using the principles described herein.

Figure 5:
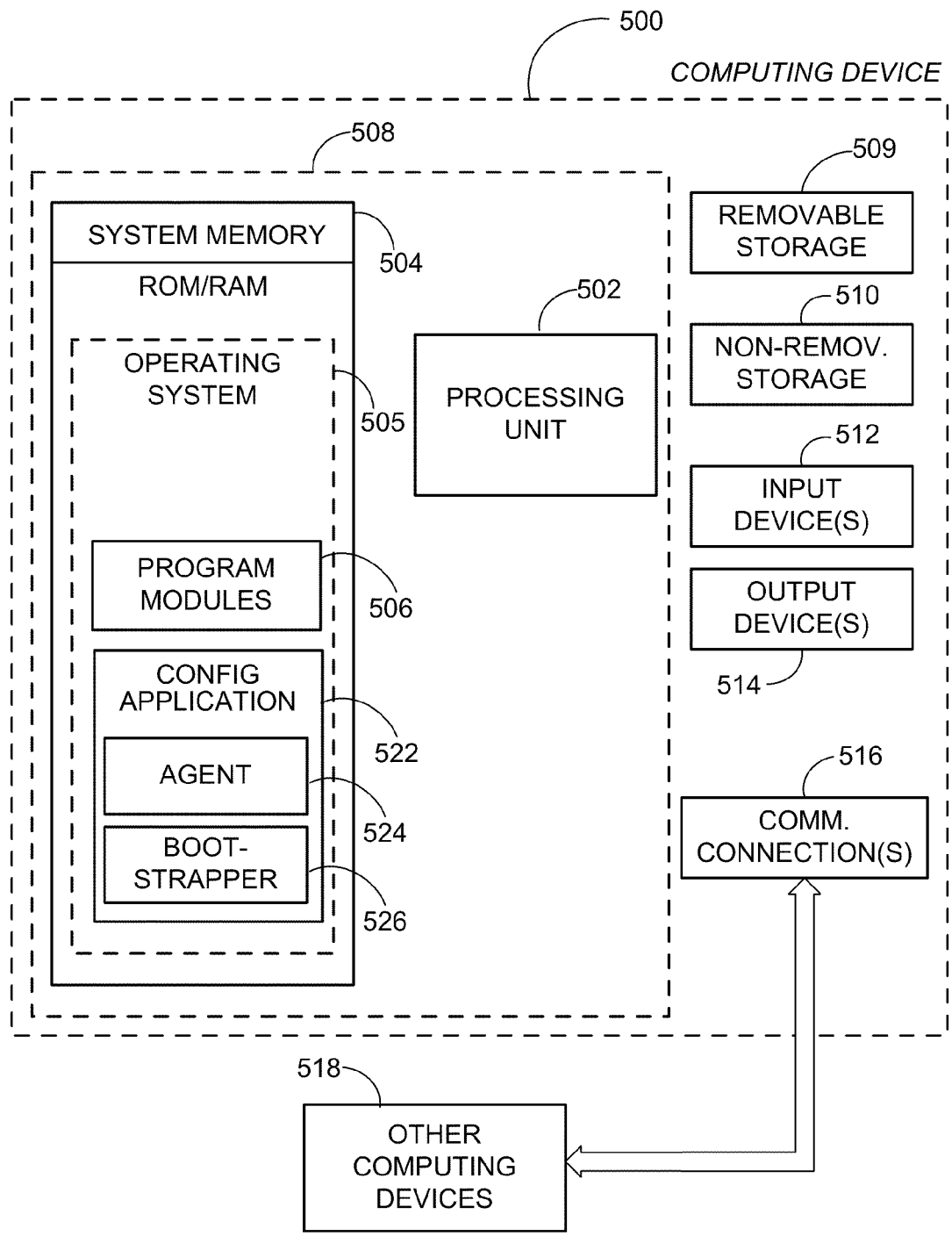
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server within a multi-modal enhanced communication system and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, configuration application 522, agent 524, and bootstrapper module 526.

Computing device 500 may be a generic server or a specific server with defined functionality and receive a replica of a topology document for the system from an administration server. Upon activation of the environment by the central deployment components, agent 524 and bootstrapper 526 may be executed independently or within the framework of a configuration application 522. Agent 522 may activate bootstrapper 526, which may check an existing configuration (if any), determine assigned role(s) and prerequisites for those roles from the replica of the topology document, install and activate the assigned roles and prerequisites. Bootstrapper 526 may also provide a feedback to the central deployment components such that local status of computing device 500 can be monitored by the system administration. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
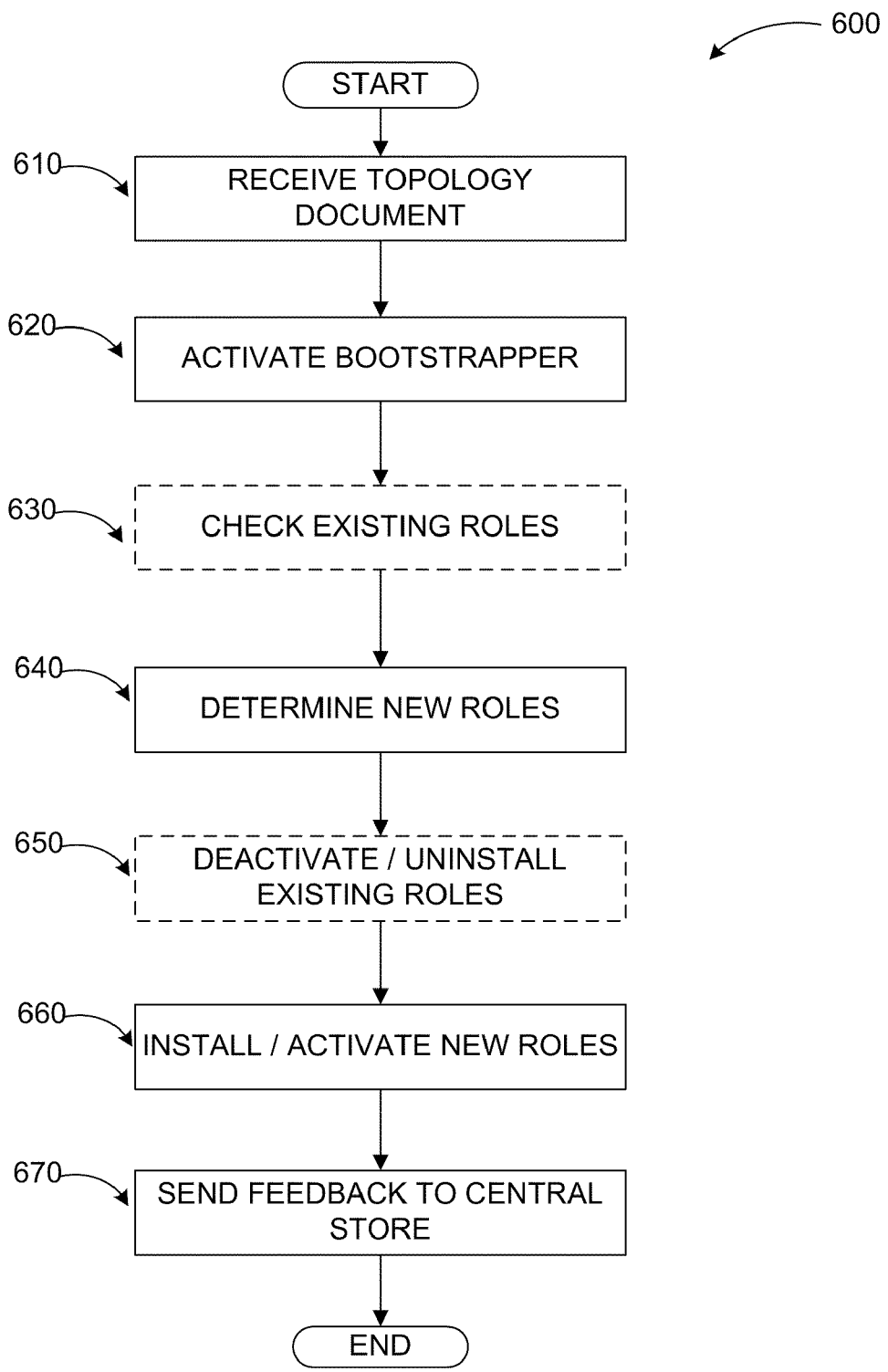
FIG. 6 illustrates a logic flow diagram for a process of providing metadata driven automatic deployment of system topology in an enhanced communication system according to embodiments.

FIG. 6 illustrates a logic flow diagram for process 600 of providing metadata driven automatic deployment of system topology in an enhanced communication system according to embodiments. Process 600 may be implemented as part of an enhanced communication system.

Process 600 begins with operation 610, where a topology document is received at a server that is to be configured for one or more specific roles. The server may or may not have existing roles (i.e. first time configuration vs. modification of roles and features based on system topology changes). The server may already have an agent and a bootstrapper module installed. At operation 620, the agent may activate the bootstrapper, which may first discover existing roles and features on the server (if any) at optional operation 630. The bootstrapper may then determine a list of assigned roles from the replica of the topology document at operation 640.

If any of the existing roles are not on the list of newly assigned roles, the bootstrapper may deactivate and uninstall those roles as part of the configuration at optional operation 650. The bootstrapper may then install and activate new roles from the list at operation 660. If any prerequisites are needed, those may be installed prior to installation and activation of the new roles as well. According to some embodiments, the bootstrapper may stop and report status back that the installation is blocked if the automated system cannot install the pre-requisites. At operation 670, a feedback may be sent to a central store with information about the current status of the server such that system administration can monitor status of servers within the system.

The operations included in process 600 are for illustration purposes. Providing metadata driven automatic deployment of distributed server systems according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for metadata driven automatic deployment of distributed server systems, the method comprising:
   receiving a topology document at a computing device to be configured, wherein the topology document defines a topology of the system including assigned roles for each server in the system; and
   automatically configuring the computing device by:
      discovering a first set of roles activated at the computing device;
      determining a second set of roles assigned to the computing device from the topology document;
      deactivating and uninstalling roles included in the first set but not in the second set;
      installing roles included in the second set, but not in the first set; and
      activating the installed roles.

2. The method of claim 1, further comprising:
   receiving an agent and a bootstrapper;
   activating the bootstrapper by the agent; and
   automatically configuring the computing device by the bootstrapper.

3. The method of claim 2, wherein the topology document, the agent, and the bootstrapper are non-specific to a particular role.

4. The method of claim 1, further comprising:
   determining a set of prerequisites for the roles to be installed; and
   installing the prerequisites prior to installing the roles.

5. The method of claim 1, further comprising:
   creating at least one database associated with at least one from a set of: the topology, a replication, and a configuration of the system to be installed at the computing device.

6. The method of claim 1, further comprising:
   uninstalling items that depend on the roles to be uninstalled in a reverse dependency order.

7. The method of claim 1, further comprising:
   if the roles to be installed include roles in a dependent structure, installing and activating the roles in a dependency order.

8. The method of claim 1, wherein the installed roles include at least one from a set of: an edge server, a director server, a web conferencing server, an application server, a mediation server, and a registrar server of an enhanced communication system.

9. The method of claim 1, further comprising:
   providing a feedback associated with a status of the configured computing device to a central deployment store.

10. The method of claim 9, wherein the feedback includes at least one from a set of: an identification of the computing device, a version identification of the topology, a result code, and at least one record associated with the installation.

11. A distributed server system facilitating metadata driven automatic deployment, the system comprising:
    a first server configured to:
       receive a topology document defining a topology of the system including assigned roles for each server in the system from a central deployment store;
       generate a deployment package including a replica of the topology document;
       distribute the deployment package to servers to be configured according to the topology;
    a second server configured to:
       receive the deployment package;
       activate a bootstrapper, wherein the bootstrapper is configured to:
          discover a first set of roles activated at the second server;
          determine a second set of roles assigned to the second server from the topology document;
          deactivate and uninstall roles included in the first set but not in the second set;
          install roles included in the second set, but not in the first set; and
          activate the installed roles.

12. The system of claim 11, wherein the bootstrapper is further configured to:
    provide a feedback associated with a status of the second server to the central deployment store, wherein the feedback includes at least one from a set of: an identification of the second server, a version identification of the topology, a result code, and at least one record associated with the installation.

13. The system of claim 11, wherein the first server is further configured to:
    upon publishing the topology document to the system, activating the topology, creating associated entries in at least one directory server, and configuring permissions.

14. The system of claim 11, wherein the first server is further configured to distribute the deployment package through at least one from a set of: a software management tool, a remote management Application Programming Interface (API), a file transfer protocol (FTP) download, Secure Hypertext Transfer Protocol (HTTPS) transfer, a network file system copy, and removable storage media.

15. The system of claim 11, wherein the second server is a new server being added to the system.

16. The system of claim 11, wherein the second server is an existing server with an existing assigned role being re-configured dynamically with at least one new role.

17. A computer-readable memory device with instructions stored thereon for facilitating metadata driven automatic deployment, the instructions comprising:

receiving a topology document defining a topology of the system including assigned roles and features for each server in the system from a central deployment store at an administration server;

generating a deployment package including a replica of the topology document;

distributing the deployment package to servers to be configured according to the topology from the administration server;

receiving the deployment package at a server; and automatically configuring the server by:
  discovering a first set of roles and features activated at the server;
  determining a second set of roles and features assigned to the server from the topology document;
  deactivating and uninstalling roles and features included in the first set but not in the second set;
  installing roles and features included in the second set, but not in the first set;
  activating the installed roles and features;
  providing a feedback associated with a status of the configured server to the central deployment store.

18. The computer-readable memory device of claim 17, wherein the instructions further comprise:
  employing an agent to detect changes in a configuration of the server based on the topology document; and
  employing a bootstrapper to automatically configure the server.

19. The computer-readable memory device of claim 18, wherein the bootstrapper is configured to be executed interactively and deliver results to a local console.

20. The computer-readable memory device of claim 17, wherein the agent and the bootstrapper are non-specific to a particular role and are assigned local permissions for the server.

* * * * *